United States Patent
Lindahl

(10) Patent No.: US 9,734,830 B2
(45) Date of Patent: *Aug. 15, 2017

(54) SPEECH RECOGNITION WAKE-UP OF A HANDHELD PORTABLE ELECTRONIC DEVICE

(71) Applicant: Apple Inc., Cupertino, CA (US)

(72) Inventor: Aram M. Lindahl, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,636

(22) Filed: Dec. 28, 2015

(65) Prior Publication Data

US 2016/0189716 A1    Jun. 30, 2016

Related U.S. Application Data

(63) Continuation of application No. 14/052,558, filed on Oct. 11, 2013, now Pat. No. 9,245,527.

(51) Int. Cl.
*G10L 15/00* (2013.01)
*G10L 15/32* (2013.01)
(Continued)

(52) U.S. Cl.
CPC .............. *G10L 15/32* (2013.01); *G10L 17/24* (2013.01); *G10L 15/01* (2013.01); *G10L 2015/223* (2013.01); *G10L 2025/783* (2013.01)

(58) Field of Classification Search
CPC ......... G10L 15/00; G10L 15/06; G10L 15/08; G10L 15/26; G10L 15/265; G10L 15/30;
(Continued)

(56) References Cited

U.S. PATENT DOCUMENTS 6,901,270 B1    5/2005    Beach
7,174,299 B2    2/2007    Fujii et al.
(Continued)

OTHER PUBLICATIONS

KêPuska, Veton, "Wake-Up-Word Speech Recognition", Chapter 12, Computer and Information Science, Artificial Intelligence, "Speech Technologies", ISBN 978-953-307-996-7, Published: Jun. 13, 2011, DOI: 10-5772/16242, (pp. 237-263).
(Continued)

*Primary Examiner* — Qi Han
(74) *Attorney, Agent, or Firm* — Blakely, Sokoloff, Taylor & Zafman LLP

(57) ABSTRACT

A system and method for parallel speech recognition processing of multiple audio signals produced by multiple microphones in a handheld portable electronic device. In one embodiment, a primary processor transitions to a power-saving mode while an auxiliary processor remains active. The auxiliary processor then monitors the speech of a user of the device to detect a wake-up command by speech recognition processing the audio signals in parallel. When the auxiliary processor detects the command it then signals the primary processor to transition to active mode. The auxiliary processor may also identify to the primary processor which microphone resulted in the command being recognized with the highest confidence. Other embodiments are also described.

18 Claims, 6 Drawing Sheets

(51) Int. Cl.
*G10L 17/24* (2013.01)
*G10L 15/01* (2013.01)
*G10L 15/22* (2006.01)
*G10L 25/78* (2013.01)

(58) Field of Classification Search
CPC ..... G10L 15/32; G10L 15/34; G10L 2015/00; G10L 2015/08; G10L 2015/223; G10L 2015/228
USPC .... 704/231, 235, 251, 255, 257, 270, 270.1, 704/275
See application file for complete search history.

(56) References Cited

U.S. PATENT DOCUMENTS

| | | | |
|---|---|---|---|
| 7,203,651 B2 | 4/2007 | Baruch et al. | |
| 7,299,186 B2 | 11/2007 | Kuzunuki et al. | |
| 7,885,818 B2 | 2/2011 | Vignoll | |
| 2009/0304203 A1 | 12/2009 | Haykin | |
| 2010/0161335 A1 | 6/2010 | Whynot | |
| 2012/0303371 A1* | 11/2012 | Labsky | G10L 13/08 704/260 |
| 2014/0278416 A1 | 9/2014 | Schuster | |

OTHER PUBLICATIONS

Obuchi, Yasunari, "Multiple-Microphone Robust Speech Recognition Using Decoder-Based Channel Selection", Workshop on Statistical and Perceptual Audio Processing, SAPA-2004, Oct. 3, 2004, Jeju, Korea, (4 pages).

Stolcke, Andreas, "Making the Most From Multiple Microphones in Meeting Recognition", Speech Technology and Research Laboratory, SRI International, Menlo Park, CA, 2011, Internet download at: www.speech.sri.com/cgi-bin/run-distill?papers/icassp2011...meetings.ps . . . , (4 pages).

Wolfel, Matthias, "Channel Selection by Class Separability Measures for Automatic Transcription on Distant Microphones", Interspeech 2007, Aug. 27-31, 2007, Antwerp, Belgium, (pp. 582-585).

Wolfel, Matthias, et al., "Combining Multi-Source Far Distance Speech Recognition Strategies: Beamforming, Blind Channel and Confusion Network Combination", Interspeech 2005, Sep. 4-8, 2005, Lisbon, Portugal, (pp. 3149-3152).

Wolfel, Matthias, et al., "Multi-Source Far-Distance Microhone Selection and Combination for Automatic Transcription of Lectures", Interspeech 2006—ICSLP, Sep. 17-21, 2006, Pittsburgh, PA, (pp. 361-364).

* cited by examiner

SPEECH RECOGNITION WAKE-UP OF A HANDHELD PORTABLE ELECTRONIC DEVICE

This application is a continuation of co-pending U.S. application Ser. No. 14/052,558 filed on Oct. 1, 2013.

FIELD OF INVENTION

Embodiments of the present invention relate generally to speech recognition techniques for hands-free wake-up of a handheld portable electronic device having multiple microphones for detecting speech.

BACKGROUND

Contemporary handheld portable electronic devices, such as mobile phones and portable media players, typically include user interfaces that incorporate speech or natural language recognition to initiate processes or perform tasks. However, for core functions, such as turning on or off the device, manually placing the device into a sleep mode, and waking the device from the sleep mode, handheld portable electronic devices generally rely on tactile inputs from a user. This reliance on tactile user input may in part be due to the computational expense required to frequently (or continuously) perform speech recognition using a processor of the device. Further, a user of a portable electronic device typically must direct his or her speech to a specific microphone whose output feeds a speech recognition engine, in order to avoid problems with ambient noise pickup.

Mobile phones now have multiple distant microphones built into their housings to improve noise suppression and audio pickup. Speech picked up by multiple microphones may be processed through beamforming. In beamforming, signals from the multiple microphones may be aligned and aggregated through digital signal processing, to improve the speech signal while simultaneously reducing noise. This summed signal may then be fed to an automatic speech recognition (ASR) engine, and the latter then recognizes a specific word or phrase which then triggers an action in the portable electronic device. To accurately detect a specific word or phrase using beamforming, a microphone occlusion process may be required to run prior to the beamforming. This technique however may result in too much power consumption and time delay, as it requires significant digital signal processing to select the "best" microphones to use, and then generate a beamformed signal therefrom.

SUMMARY

The usage attributes of a handheld portable electronic device may limit the viability of using speech recognition based on beamforming to perform the basic task of waking up a portable electronic device that is in sleep mode. Even though the portable electronic device has microphones to better detect speech, the unpredictable nature of the usage of such a device could make it prohibitively "expensive" to constantly run a microphone occlusion detection process to determine which microphone is not occluded (so that it can be activated for subsequent beamforming). For example, a smart phone can be carried partially inside a pocket, in a purse, in a user's hand, or it may be lying flat on a table. Each of these usage cases likely has a different combination of one or more microphones that are not occluded, assuming for example that them are at least three microphones that are built into the smartphone housing. The solution of microphone occlusion detection and beamforming may present too much computational and power expense in this context, to perform speech recognition wake up of the device.

In one embodiment of the invention, a handheld portable electronic device includes at least two processors namely a primary processor and an auxiliary processor. The primary processor is configured to perform a wide range of tasks while the device is in wake mode, including complex computational operations, such as rendering graphical output on a display of the device and transmitting data over a network. In contrast, the auxiliary processor is configured to perform a relatively limited range or small number of computationally inexpensive operations while the device is in significant power-saving or "sleep" mode. Such tasks include detecting a short phrase or command spoken by a user of the device. The primary processor when fully active requires a much greater amount of overall power than the auxiliary processor. The primary processor itself can transition to a power-saving mode, such as a deactivated or sleep state, by, for example, essentially ceasing all computational operations. Placing the primary processor into power-saving mode may substantially decrease the burden on the power source for the device (e.g., a battery). Conversely, the auxiliary processor requires a much smaller amount of power to perform its functions (even when fully active). The auxiliary processor may remain fully functional (i.e., activated or awake), while the primary processor is in the power-saving mode and while the portable device as a whole is in sleep mode.

Each of the processors is communicatively coupled with a number of microphones that are considered part of or integrated in the portable electronic device. These microphones are oriented to detect speech of a user of the portable electronic device and generally are differently positioned—e.g., the microphones may detect speech on different acoustic planes by being remotely located from one another in the portable electronic device and/or by being oriented in different directions to enable directional speech pickup.

When the primary processor transitions to its power-saving mode or state, and the auxiliary processor at the same time remains activated, the auxiliary processor may detect a command spoken by the user which then causes the primary processor to transition to an activated or awake state. For example, the auxiliary processor may detect the spoken command being the phrase "wake up" in the speech of the user and, in response, signal the primary processor to transition to the activated state. At that point, the device itself can transition from sleep mode to wake mode, thereby enabling more complex operations to be performed by the primary processor.

As is often the case with portable electronics, one or more of the built-in microphones may be occluded. For example, the user may have placed the device on a table, in a pocket, or may be grasping the device in a manner that causes at least one microphone to be occluded. The occluded microphone cannot be relied upon to detect speech input from the user and the unpredictable nature of portable electronics renders it impossible to predict which microphone will be occluded. However, if there are only a few microphones, the auxiliary processor can be configured to receive the audio signal from each microphone, and can process these audio signals in parallel regardless of any of the microphones being occluded, to determine if the user has spoken a detectable command. Even if one or more microphones are occluded, the auxiliary processor may still detect the command as long as at least one microphone is sufficiently unobstructed.

In one embodiment, the auxiliary processor receives the audio signal from each microphone and simultaneously processes the audio signals using a separate speech recognition engine for each audio signal. A speech recognition engine may output, for example, a detected command (word or phrase) and optionally a detection confidence level. If the detected word or phrase, and optionally its confidence level, output by at least one speech recognition engine sufficiently matches a pre-defined wake-up word or phrase, or the confidence level exceeds a predetermined threshold, then the auxiliary processor may determine that the user has spoken a wake command and may in response perform one or more operations consistent with the detected command (e.g., activating the primary processor). Note that even though multiple speech recognition engines are running simultaneously, overall power consumption by the auxiliary processor can be kept in check by insisting on the use of a "short phrase" recognition processor whose vocabulary is limited, for example, to at most ten (10) words, and/or the wake command is limited, for example, to at most five (5) words. This would be in contrast to the primary processor, which is a "long phase" recognition processor whose vocabulary is not so limited and can detect phrases of essentially any length.

In a further embodiment, the auxiliary processor selects a preferred microphone based on the detected command and/or its confidence level. The preferred microphone may be selected to be the one from which the audio signal yielded recognized speech having the highest confidence level (relative to the other microphones). A high confidence level may indicate that the associated microphone is not occluded. The auxiliary processor may then signal the primary processor that the preferred microphone is not occluded, and is likely the "optimal" microphone for detecting subsequent speech input from the user. The primary processor may immediately begin monitoring speech of the user using, for example, only the preferred microphone, without having to process multiple microphone signals (e.g., without beamforming) and/or without having to determine anew which microphone to use for speech input.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
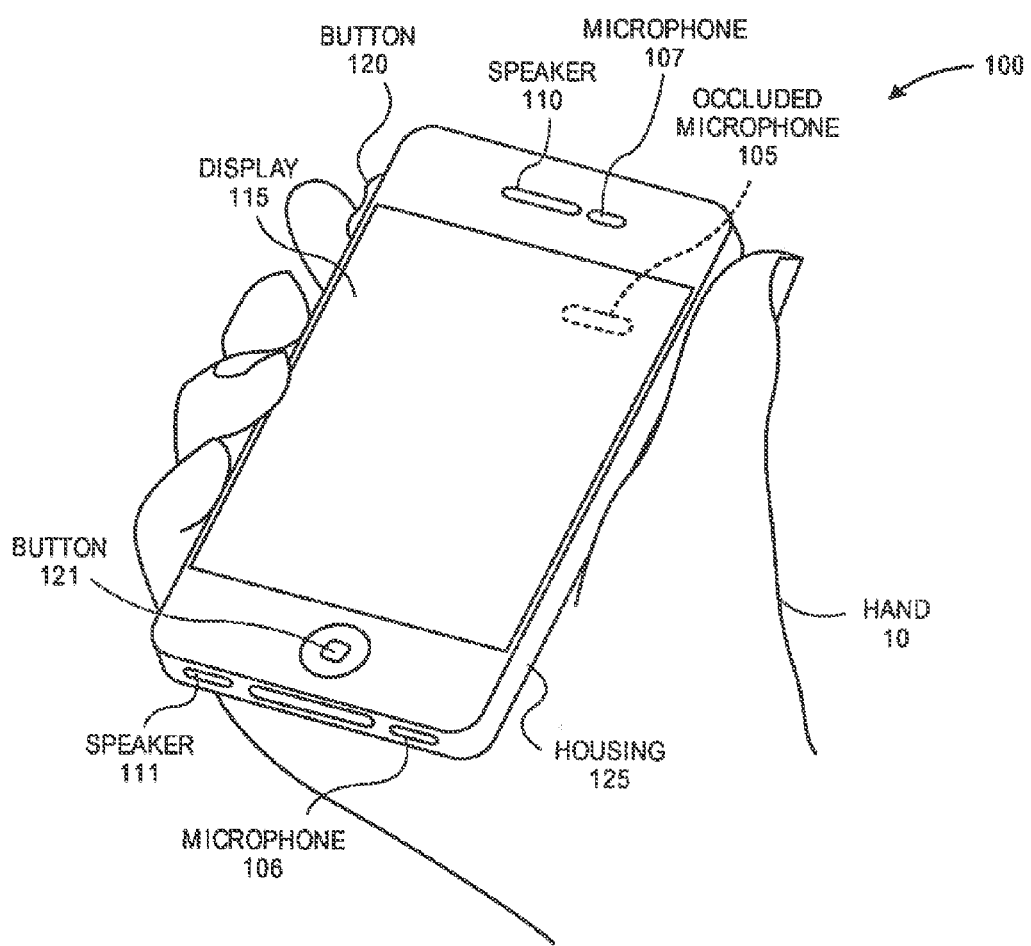
FIG. 1 is a handheld portable electronic device having a multiple microphones integrated therein grasped by a user in a manner that occludes one of the microphones.

FIG. 1 depicts a handheld portable electronic device 100, also referred to as a mobile communications device, in an exemplary user environment. The handheld portable electronic device 100 includes a number of components that are typically found in such devices. Here, the handheld portable electronic device 100 includes a display 115 to graphically present data to a user, speakers 110-111 to acoustically present data to the user, and physical buttons 120-121 to receive tactile input from the user. A housing 125 of the handheld portable electronic device 100 (e.g., a smartphone or cellular phone housing) encases the illustrated components 105-121.

In the illustrated embodiment, the handheld portable electronic device 100 has no more than four microphones of which there are the microphones 105-107 that are differently positioned within the housing 125 of the device 100: one microphone 105 is located on a back face of the device 100, a second microphone 106 is located on a bottom side of the device 100, and a third microphone 107 is located on a front face of the device 100. Each of these microphones 105-107 may be omnidirectional but picks up sound on a different acoustic plane as a result of their varying locations and orientations, and may be used to pick up sound used for different functions—e.g., one microphone 106 may be closest to the talker's mouth and hence is better able to pick up speech of the user (e.g., transmitted to a far-end user during a call), while a second microphone 105 and a third microphone 107 may be used as a reference microphone and an error microphone, respectively, for active noise cancellation during the voice call. However, unless occluded, all of the microphones 105-107 may be used for some overlapping functionality provided by the portable electronic device 100—e.g., all of the microphones 105-107 may be able to pick up some speech input of the user that causes the device 100 to perform one or more functions. Note that the handheld portable electronic device 100 may also include an audio jack or other similar connector (not shown), and/or a Bluetooth interface, so that headphones and/or an external microphone can be communicatively coupled with the device 100. An external microphone may operate in a manner analogous to the illustrated microphones 105-107 so that the audio signal from the external microphone may be processed in parallel (in the same manner as the signals from microphones 105-107). Furthermore, additional microphones may be integrated in the handheld portable electronic device 100, such as a fourth microphone (not shown) on a top side of the housing 125. Alternatively, the handheld portable electronic device 100 may only incorporate two microphones (e.g., the microphone 107 may be absent from some embodiments, and one of the two microphones may be external to the housing 125).

In the embodiment of FIG. 1, a user of the portable electronic device 100 is grasping the device 100 in a hand 10 of the user, as may be typical when the user is removing the device 100 from a pocket or when the user is carrying the device 100. Here, the user is grasping the handheld portable electronic device 100 in such a way that the hand 10 of the user causes one microphone 105 to be occluded. Consequently, the occluded microphone 105 cannot be relied upon to receive speech input from the user because sound may not be picked up by the occluded microphone 105 or may be unacceptably distorted or muffled.

The remaining two microphones 106-107 are unobstructed and therefore may satisfactorily pick up speech input from the user. However, the two unobstructed microphones 106-107 pickup sound on different acoustic planes due to their different locations in the housing 125. Speech input from the user may be clearer across one acoustic plane than another, but it is difficult to automatically establish (within a software process running in the handheld portable electronic device 100) to know which microphone 106-107 will receive a clearer audio signal from the user (here, a speech signal), or even that one microphone 105 is occluded and thus receives an unsatisfactory audio signal. Therefore, it may be beneficial for the handheld portable electronic device 100 to perform automatic speech recognition (ASR) processes upon the audio signals picked up by all of the microphones 105-107 in parallel, to determine if the user is speaking a recognizable word or phrase, and/or to select a preferred microphone of the plurality 105-107 that is to be used to receive speech input from the user going forward.

Figure 2:
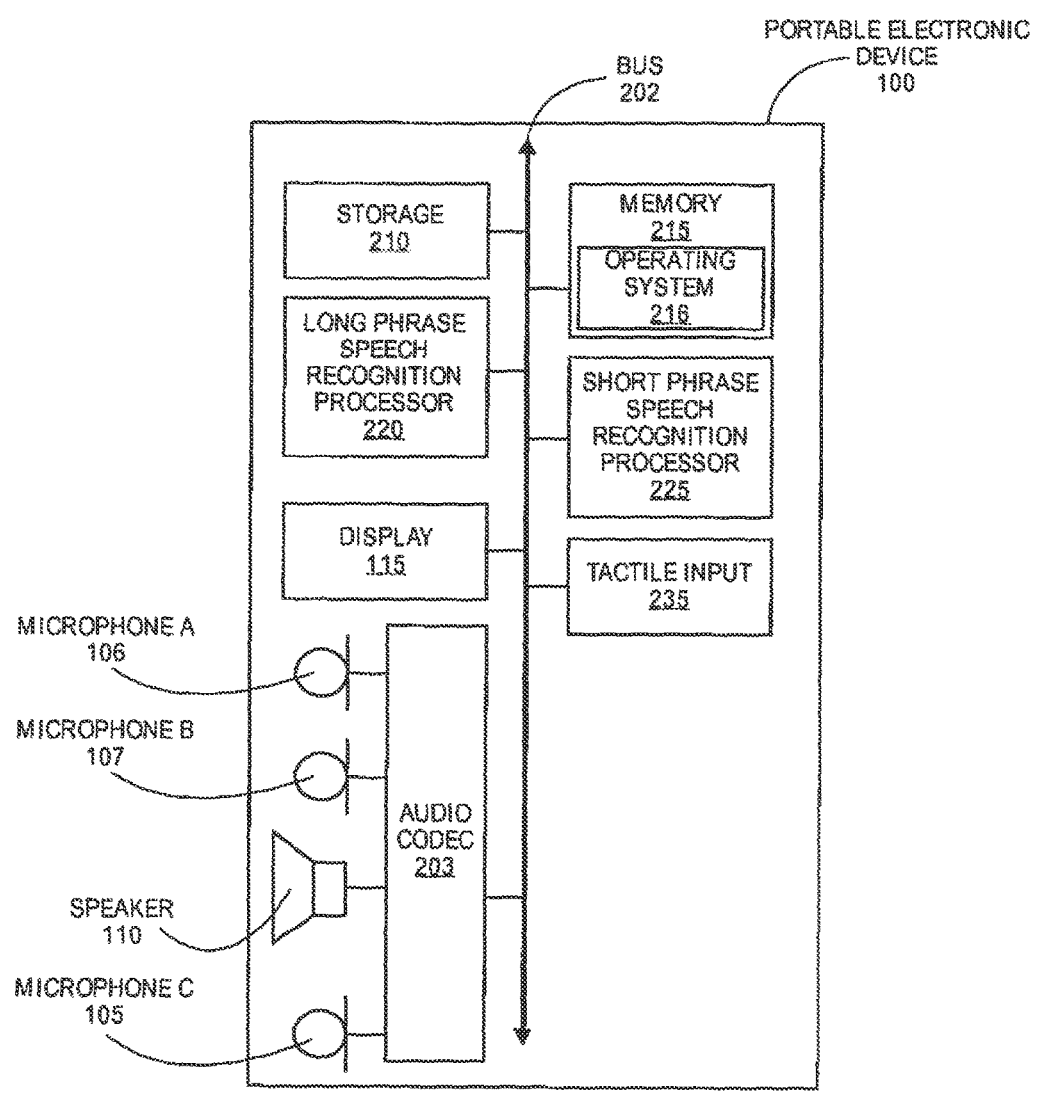
FIG. 2 is a block diagram of one embodiment of the handheld portable electronic device that is to perform parallel phrase recognition using a short phrase speech recognition processor.

Turning now to FIG. 2, a block diagram shows one embodiment of the handheld portable electronic device 100 configured to perform parallel phrase recognition using a short phrase speech recognition processor 225 that is communicatively coupled with the microphones 105-107. The handheld portable electronic device 100 can be, but is not limited to, a mobile multifunction device such as a cellular telephone, a smartphone, a personal data assistant, a mobile entertainment device, a handheld media player, a handheld tablet computer, and the like. In the interest of conscientiousness, many components of a typical handheld portable electronic device 100, such as a communications transceiver and a connector for headphones and/or an external microphone, are not shown by FIG. 2.

The handheld portable electronic device 100 includes, but is not limited to, the microphones 105-107, a storage 210, a memory 215, a long phrase recognition processor 220, a short phrase recognition processor 225, the display 115, a tactile input device 235, and the speaker 110. One or both of the processors 220-225 may drive interaction between the components integrated in the handheld portable electronic device 100. The processors 220, 225 may communicate with the other illustrated components across a bus subsystem 202. The bus 202 can be any subsystem adapted to transfer data within the portable electronic device 100.

The long phrase speech recognition processor 220 may be any suitably programmed processor within the handheld portable electronic device 100 and may be the primary processor for the portable electronic device 100. The long phrase speech recognition processor may be any processor such as a microprocessor or central processing unit (CPU). The long phrase speech recognition processor 220 may also be implemented as a system on a chip (SOC), an applications processor, or other similar integrated circuit that includes, for example, a CPU and a graphics processing unit (GPU) along with some memory 215 (e.g., volatile random-access memory) and/or storage 210 (e.g., non-volatile memory).

Among other functions, the long phrase speech recognition processor 220 is provided with a voice user interface that is configured to accept and process speech input from a user of the portable electronic device. The long phrase speech recognition processor 220 may detect words or phrases in the speech of the user, some of which may be predefined commands that cause predetermined processes to execute. In one embodiment, the long phrase speech recognition processor 220 offers a more dynamic and robust voice user interface, such as a natural language user interface. The long phrase speech recognition processor 220 may have complex and computationally expensive functionality, to provide services or functions such as intelligent personal assistance and knowledge navigation.

The long phrase speech recognition processor 220 may be configured to have two states: an activated state and a deactivated state. In the activated state, the long phrase speech recognition processor 220 operates to drive interaction between the components of the portable electronic device 100, such as by executing instructions to perform, rendering output on the display 115, and the like. In this activated state, the long phrase speech recognition processor 200 is "awake" and fully functional and, accordingly, consumes a relatively large amount of power. Conversely, the long phrase speech recognition processor 220 performs few, if any, operations while in the deactivated state or "asleep" state. The long phrase speech recognition processor 220 consumes substantially less power while in this deactivated state or "power-saving mode" because few, if any, operations are performed that cause an appreciable amount power of the portable electronic device 100 to be consumed.

The state of the long phrase speech recognition processor 220 may influence the state of one or more other components of the portable electronic device. For example, the display 115 may be configured to transition between an activated or "on" state, in which power is provided to the display and graphical content is presented to the user thereon, and a deactivated or "off" state, in which essentially no power is provided to the display so that no graphical content can be presented thereon. The display 115 may transition between states consistent with the state of the long phrase speech recognition processor 220, such that the display is deactivated when the long phrase speech recognition processor 220 is in a power-saving mode, and is activated when the long phrase speech recognition processor 220 is not in the power-saving mode. The display 115 may receive a signal from either processor 220, 225 that causes the display 115 to transition between activated and deactivated states. Other components, such as storage 210 and a communications transceiver (not shown), may operate in a sleep-wake transition process that is similar to that described with respect to the display 115.

The short phrase speech recognition processor 225 may operate similarly to the long phrase speech recognition processor 220, although on a smaller scale. Thus, the short phrase speech recognition processor 225 may be an auxiliary processor, rather than a primary processor, or a processor with otherwise dedicated tasks such as sensor data processing, or power and temperature management data processing. The short phrase processor 225 may be configured to perform a relatively small number or limited range of operations (relative to the long phrase processor 220). The short phrase speech recognition processor 225 may be any processor such as a microprocessor or central processing unit (CPU) or a microcontroller. Further, the short phrase speech recognition processor 225 may be implemented as a system on a chip (SOC) or other similar integrated circuit. In one embodiment, the short phrase speech recognition processor 225 is an application-specific integrated circuit (ASIC) that includes, for example, a microprocessor along with some memory 215 (e.g., volatile random-access memory) and/or storage 210 (e.g., non-volatile memory). In one embodiment, the short phrase recognition processor 225 may be incorporated with the long phrase recognition processor 225. For example, both processors 220, 225 may be formed in the same SOC or integrated circuit die.

The overall power state of the portable electronic device 100 decreases (e.g., where the long phrase recognition processor 220 is in the deactivated state) but the portable electronic device remains configured to recognize a command, based on a limited stored vocabulary, that is to cause the power state of the portable electronic device 200 to increase (e.g., using the short phrase recognition processor 225 that remains in the activated state).

Like the long phrase speech recognition processor 220, the short phrase speech recognition processor 225 is configured with a voice user interface to detect speech from a user of the portable electronic device 100 (e.g., speech input of simple words or phrases, such as predefined commands that cause predetermined processes to execute). However, the short phrase speech recognition processor 225 generally does not feature the broad functionality of the long phrase speech recognition processor 220. Rather, the short phrase speech recognition processor 225 is configured with a limited vocabulary, such as at most ten (10) words in a given language, and with limited data processing capabilities, e.g., limited to recognize at most five (5) words. Because the short phrase recognition processor 225 is configured to accept very limited speech input, its functionality is generally computationally inexpensive and power conservative. In contrast, because the portable device is awake, the long phrase speech recognition processor 220 can interact with a remote server over a wireless communication network (e.g., a cellular phone data-network) by sending the microphone signals to the remote server for assistance with speech recognition processing.

The short phrase recognition processor 225 is configured to be complementary to the long phrase recognition processor 220 by remaining activated while the long phrase recognition processor 220 is deactivated. The short phrase recognition processor 225 may accomplish this in any combination of ways—e.g., it may be perpetually activated, or it may be activated in response to the transition of the long phrase recognition processor 220 to the deactivated state, and/or deactivated in response to the transition of the long phrase recognition processor 220 to the activated state. Accordingly, the handheld portable electronic device 100 remains configured to detect one or more commands even where the device 100 is in a power-saving mode (e.g., while the portable electronic device 100 is "asleep").

To "wake up" the device 100 (e.g., cause the long phrase recognition processor 220 to transition to the activated state), the short phrase recognition processor 225 is configured to transmit a signal indicating a wake up event that is to cause the long phrase recognition processor 220 to transition to the activated state. The short phrase recognition processor 225 may signal the long phrase recognition processor 220 in response to detecting a command in the speech of the user. For example, the user may speak the command, "Wake up," which the short phrase recognition processor 225 detects and, in response, signals the long phrase recognition processor 220 to transition to the activated state.

In one embodiment, the short phrase recognition processor 225 is configured to unlock the device 100 so that the device 100 can receive input through the tactile input processor or interface 235. Unlocking the device 100 may be analogous to or may occur in tandem with waking the device 100 from a sleep mode, and therefore the short phrase recognition processor 225 may likewise provide such a signal (in response to detecting a command in the speech of the user). In unlocking the device 100, the short phrase recognition processor 225 may provide a signal that causes the operating system 216 in the memory 215 to perform one or more operations, such as unlocking or turning on the tactile input 235. The operating system 216 may receive such a signal directly from the short phrase recognition processor 225 or indirectly through the long phrase recognition processor 220. Further to unlocking the device, the operating system 216 may issue signals to activate various applications (not shown), which are configured to be executed by the long phrase recognition processor 220 while in the memory 215, to activate other hardware of the device 100 (e.g., turn on display 115).

In one embodiment, the short phrase recognition processor 225 will first detect a trigger word or phrase that indicates the short phrase recognition processor 225 is to process the words spoken by the user immediately following. For example, the user may speak, "Device," which indicates that the short phrase recognition processor 225 is to process the immediately succeeding words spoken by the user. In this way, the short phrase recognition processor 225 can "listen" for the trigger word before determining if subsequent words are to be evaluated to determine if any action is to be taken.

Both processors 220, 225 are communicatively coupled with the microphones 105-107 of the portable electronic device 100. Generally, these microphones are differently positioned within the device 100 so as to pickup sound on different acoustic planes, though all of the microphones 105-107 are suitable to pickup the speech of a user for recognition by the processors 220, 225. While in FIG. 1 each of the microphones is illustrated as being within the housing 125 of portable electronic device 100, there may be an external microphone that is also communicatively coupled with the processors 220, 225, such as by a jack (not shown). In one embodiment, the short phrase recognition processor 225 is configured to process the output signals of the microphones (for purpose of speech recognition) while the long phrase recognition processor 220 is in the deactivated state and the device 100 is asleep, and the long phrase recognition processor 220 (and not the short phrase processor 225) processes the output signals of the microphones when it and the device 100 are in the activated state.

The device may include an audio codec 203 for the microphones and the speaker 110 so that audible information can be converted to usable digital information and vice versa. The audio codec 203 may provide signals to one or both processors 220, 225 as picked up by a microphone and may likewise receive signals from a processor 220, 225 so that audible sounds can be generated for a user though the speaker 110. The audio codec 203 may be implemented in hardware, software, or a combination of the two and may include some instructions that are stored in memory 215 (at least temporarily) and executed by a processor 220, 225.

The short phrase recognition processor 225 is configured to process the output signals of the microphones in parallel. For example, the short phrase recognition processor 225 may include a separate speech recognition engine for each microphone so that each output signal is processed individually. When an output of any one of the speech recognition engines reveals that a command is present in an output signal of its associated microphone (and therefore present in the speech input of the user), the short phrase recognition processor 225 may signal the long phrase recognition processor 220 to transition from the deactivated state to the activated state. In one embodiment, the short phrase recognition processor 225 is further configured to provide a signal to the long phrase recognition processor 220 that identifies one of the microphones 105-107 as the one that outputs a preferred signal—e.g., the microphone whose respective audio signal has the highest confidence level for a detected command (as computed by the processor 225).

In the handheld portable electronic device 100, processing the microphone signals in parallel may be beneficial because it is difficult to determine or anticipate which, if any, of the microphones 105-107 is occluded. The short phrase recognition processor 225 may not know in advance which microphone signal to rely upon to determine if the user is speaking a command. Moreover, beamforming may provide an unreliable signal for the short phrase recognition processor 225 because the output signal from an occluded microphone may result in obscuring a command in the beamformed signal (e.g., a confidence level that the command is in the speech input of the user may fail to reach a threshold level).

In one embodiment, the speech recognition engines are part of a processor that is programmed by speech recognition software modules that are in storage 210 and/or memory 215. Both storage 210 and memory 215 may include instructions and data to be executed by one or both of the processors 220, 225. Further, storage 210 and/or memory 215 may store the recognition vocabulary (e.g., a small number of words, such as no more than ten words for a given language) for the short phrase recognition processor 225 in one or more data structures.

In some embodiments, storage 210 includes non-volatile memory, such as read-only memory (ROM), flash memory, and the like. Furthermore, storage 210 can include removable storage devices, such as secure digital (SD) cards. Storage 210 can also include, for example, conventional magnetic disks, optical disks such as CD-ROM or DVD based storage, magneto-optical (MO) storage media, solid state disks, flash memory based devices, or any other type of storage device suitable for storing data for the handheld portable electronic device 100.

Memory 215 may offer both short-term and long-term storage and may in fact be divided into several units (including units located within the same integrated circuit die as one of the processors 220, 225). Memory 215 may be volatile, such as static random access memory (SRAM) and/or dynamic random access memory (DRAM). Memory 215 may provide storage of computer readable instructions, data structures, software applications, and other data for the portable electronic device 200. Such data can be loaded from storage 210 or transferred from a remote server over a wireless network. Memory 215 may also include cache memory, such as a cache located in one or both of the processors 220, 225.

In the illustrated embodiment, memory 215 stores therein an operating system 216. The operating system 216 may be operable to initiate the execution of the instructions provided by an application (not shown), manage hardware, such as tactile input interface 235, and/or manage the display 115. The operating system 216 may be adapted to perform other operations across the components of the device 100 including threading, resource management, data storage control and other similar functionality. As described above, the operating system 216 may receive a signal that causes the operating system 216 to unlock or otherwise aid in waking up the device 100 from a sleep mode.

So that a user may interact with the handheld portable electronic device 100, the device 100 includes a display 115 and a tactile input 235. The display 115 graphically presents information from the device 100 to the user. The display module can use liquid crystal display (LCD) technology, light emitting polymer display (LPD) technology, or other display technology. In some embodiments, the display 115 is a capacitive or resistive touch screen and may be sensitive to haptic and/or tactile contact with a user. In such embodiments, the display 115 can comprise a multi-touch-sensitive display.

The tactile input interface 235 can be any data processing means for accepting input from a user, such as a keyboard, track pad, a tactile button, physical switch, touch screen (e.g., a capacitive touch screen or a resistive touch screen), and their associated signal processing circuitry. In embodiments in which the tactile input 235 is provided as a touch screen, the tactile input 235 can be integrated with the display 115. In one embodiment, the tactile input 235 comprises both a touch screen interface and tactile buttons (e.g., a keyboard) and therefore is only partially integrated with the display 115.

Figure 3:
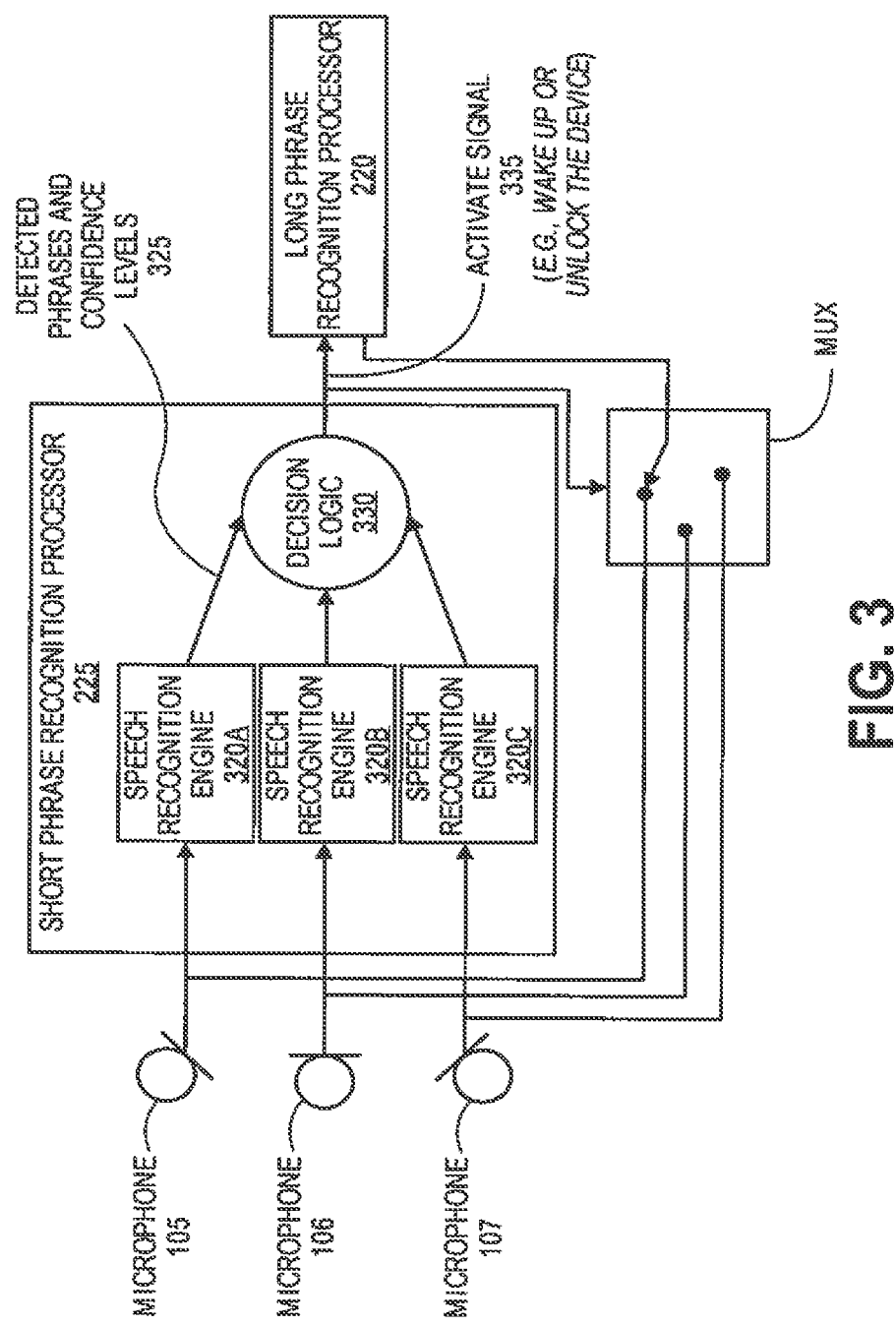
FIG. 3 is a block diagram of one embodiment of a short phrase recognition processor.

With reference to FIG. 3, this is a more detailed view of the short phrase recognition processor 225, according to one embodiment of the invention. The short phrase recognition processor is configured to receive multiple audio signals from the microphones 105-107, respectively and provide an activate signal 335 to the long phrase recognition processor 220 based on a command, such as a word or phrase, it has detected in any one of the audio signals.

In the illustrated embodiment, each input audio signal feeds a respective speech recognition (SR) engine 320, and the speech recognition engines 320 process the audio signals in parallel, i.e. there is substantial time overlap amongst the audio signal intervals or frames that are processed by all of the SR engines 320. Thus, each of the microphones corresponds to or is associated with a respective speech recognition engine 320A-C so that the respective audio signal from each microphone is processed by the respective speech recognition engine 320A-C associated with that microphone.

A speech recognition engine 320A-C may be implemented as a software programmed processor, entirely in hardwired logic, or a combination of the two. A command or other predetermined phrase can be detected by the decision logic 330, by comparing a word or phrase recognized by any one of the SR engines 320 to an expected or target word or phrase. The speech recognition engine may output a signal that includes the recognized word or phrase and optionally a confidence level.

Each speech recognition engine 320A-C may be comprised of circuitry and/or logic components (e.g., software) that process an audio signal into interpretable data, such as a word or sequence of words (i.e., a phrase). A speech recognition engine 320 may decode speech in an audio signal 310 into one or more phonemes that comprise a word spoken by the user. A speech recognition engine 320 may include an acoustic model that contains statistical representations of phonemes. The speech recognition engines 320A-C may share a common acoustic model, such as a file or data structure accessible by all the speech recognition engines 320A-C, or consistent acoustic models may be stored for individual speech recognition engines 320A-C in individual files or other data structures. Generally, the short phrase recognition processor is configured to be computationally and power conservative, and therefore the speech recognition engines 320A-C are relatively limited in the number words that they are capable of decoding, in comparison to the long phrase processor. In one embodiment, a speech recognition engine 320 may only decode speech input in an audio signal in increments of five (5) words— e.g., a trigger word, such as "device," and four or fewer words following that trigger word, such as "wake up."

A speech recognition engine 320 may derive one or more words spoken by a user based on the phonemes in the speech input of the user and the statistical representations of the phonemes from the acoustic model. For example, if the user speaks the phrase "wake up," a speech recognition engine may decode the speech from its respective audio signal into the two sets of phonemes (based on a pause, or empty frame(s), in the audio signal 310 between the two words): (1) a first set of phonemes for "wake" comprising /w/, /ā/, and /k/; and (2) a second set of phonemes for "up" comprising /u/ and /p/. From the acoustic model, the speech recognition engine 320 may determine that the first set of phonemes indicates that the user has spoken the word "wake" and the second of phonemes indicates that the user has spoken the word "up."

A speech recognition engine 320 may further include a vocabulary comprised of an active grammar that is a list of words or phrases that are recognizable by a speech recognition engine 320. Following the preceding example, the active grammar may include "wake" and "up" and, in sequence, "wake up" is a recognizable command in the vocabulary available to the speech recognition engine 320. The SR engines 320A, B, C may be essentially identical, including the same vocabulary.

The speech recognition engines 320A-C may have the same vocabulary, which may be stored in a data structure that is accessible by all the speech recognition engines 320A-C or consistent vocabularies may be stored for individual speech recognition engines 320A-C in individual data structures. Because the speech recognition engines 320A-C are configured as part of a command and control arrangement, the words or phrases in the vocabulary correspond to commands that are to initiate (i.e., "control") one or more operations, such as transmitting an activate signal 335. Generally, the short phrase recognition processor 225 is configured to be computationally limited and power conservative, and therefore the vocabulary available to the speech recognition engines 320A-C is relatively limited. In one embodiment, the vocabulary is limited to at most ten (10) words or phrases. In another embodiment, each speech recognition engine 320 may only process very short strings or phrases, e.g. no more than five words per string or phrase.

A speech recognition engine 320 may additionally indicate a confidence level representing the probability that its recognition of a word or phrase is correct. This confidence level may be outputted as a percentage or other numerical value, where a high value corresponds to the likelihood that the detected word or phrase is correct in that it matches what was spoken by the user.

A speech recognition engine 320 may include other circuitry or logic components that optimize or otherwise facilitate the detection of a command. In one embodiment, a speech recognition engine may include a voice activity detector (VAD). The VAD of a speech recognition engine 320 may determine if there is speech present in a received audio signal. If the VAD does not detect any speech in the audio signal 310, then speech recognition engine 320 may not need to further process the audio signal because a command would not be present in ambient acoustic noise.

Signals from the speech recognition engines 320A-C that indicate a detected word or phrase and/or a confidence level are received at the decision logic 330. In tandem with the speech recognition engines 320, the decision logic 330 may perform additional operations for the command and control behavior of the short phrase recognition processor 225. In one embodiment, the decision logic 330 receives the detected words or phrases and/or confidence levels as a whole (from all of the multiple SR engines 320) and evaluates them to determine if a detected word or phrase matches a predetermined (stored) command. The decision logic 330 may also compare each confidence level to a predetermined threshold value, and if none of the confidence levels exceeds the threshold then no activate signal 335 is transmitted to the long phrase recognition processor 220 (a command has not been detected). However, if one or more confidence levels exceed the predetermined threshold and the associated recognized word or phrase matches the expected or target word or phrase of a command, then the activate signal 335 is transmitted to the long phrase recognition processor. The activate signal 335 is to cause the long phrase recognition processor to transition from its deactivated state to an activated state, which may cause the device 100 as a whole to wake up or unlock, such as by turning on the display or activating the tactile input.

In one embodiment, the decision logic 330 weighs the confidence levels against one another to determine which microphone is not occluded and should therefore be used by the long phrase recognition processor for speech recognition. Because the confidence level signals 325 are received from individual speech recognition engines 320A-C that correspond to the individual microphones 105-107, the decision logic 330 may evaluate the confidence levels as they relate to the microphones. In one embodiment, the decision logic 330 identifies the highest confidence level among several received confidence levels (n.b., this highest confidence level may be required to exceed a predetermined threshold). The decision logic 330 may also consider whether or not the same phrase or word has been recognized in parallel, by two or more of the SR engines 320. The microphone corresponding to the highest identified confidence level (and, optionally, from which the same word or phrase as at least one other SR engine has been recognized) is then identified to be an "unobstructed" or unoccluded microphone suitable to receive speech input from the user. Subsequently, the decision logic 330 may provide an identification of this preferred microphone to the long phrase recognition processor 220, e.g., as part of the activate signal 335 or in a separate signal (not shown). The long phrase recognition processor 220 may then immediately begin (after becoming activated) monitoring speech of the user for speech input using only the preferred microphone, without having to process multiple audio signals and/or determine which microphone to use for speech input. This use of the preferred microphone to the exclusion of the others is indicated by the mux symbol in FIG. 3.

Figure 4:
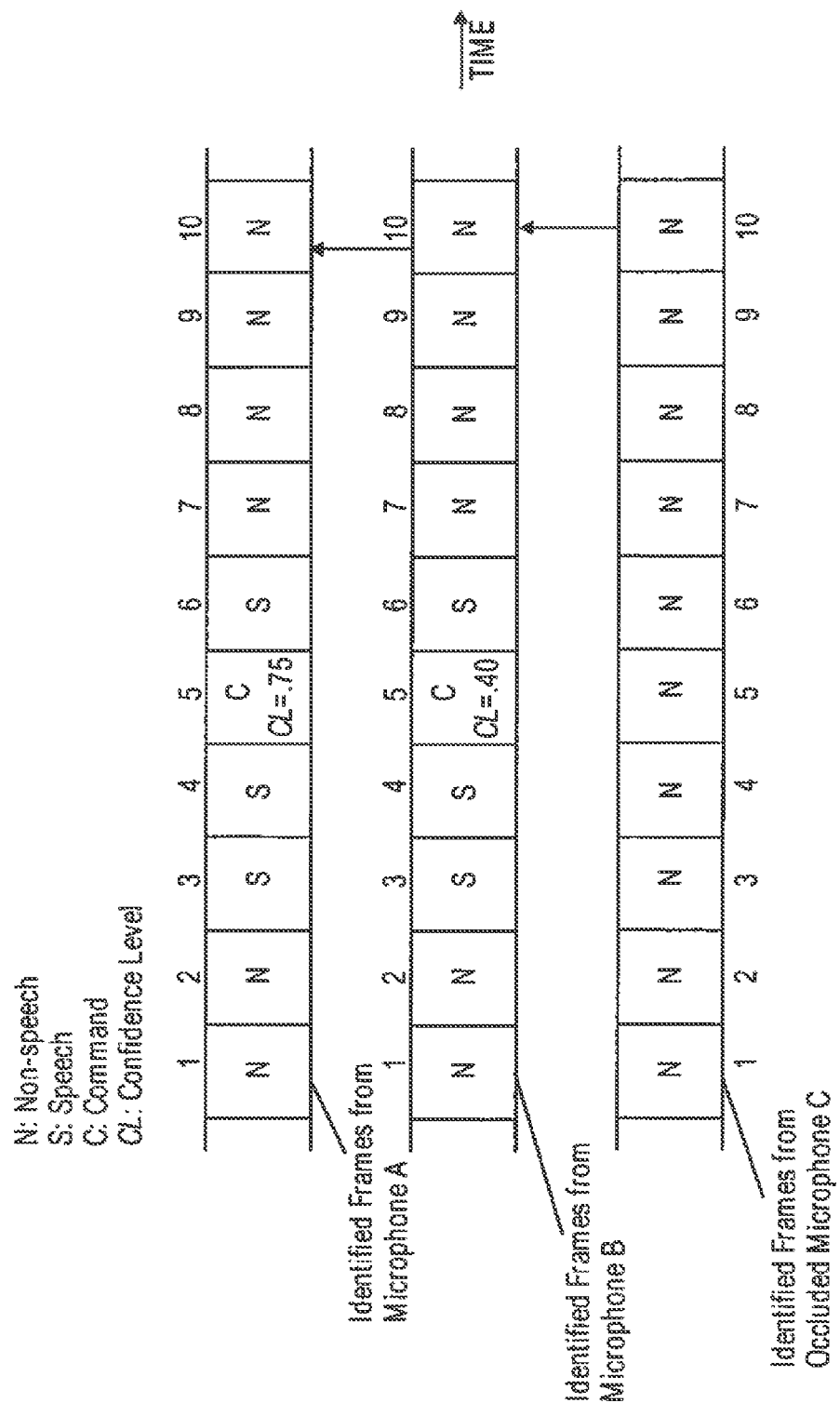
FIG. 4 shows three frame sequences that are being processed in parallel by a three speech recognition engines, respectively.

With respect to FIG. 4, this figure shows an example of three sequences of frames containing digitized audio signals that overlap in time and that have been processed by the speech recognition engines 320A, B, C, based on which recognition results are provided to the decision logic 330 in the short phrase recognition processor 225. Three speech recognition engines 320A, B, C may process audio signals from three microphones A, B, and C, respectively. Additional microphones and corresponding SR engines may be included in other embodiments, or only two microphones (with only two SR engines) may be included in a simpler embodiment (corresponding to just two digital audio sequences). The method of operation for other such embodiments is analogous to that shown in FIG. 4, though with more or fewer sequences of frames.

Each speech recognition engine 320 may process an audio signal from a corresponding microphone as a series of frames having content to be identified. In one embodiment, a speech recognition engine is configured to identify the content of a frame as either speech (S) or non-speech (N) (e.g., only ambient acoustic noise). If a frame of an audio signal includes only non-speech, no further processing by the speech recognition engine may be necessary (because there is no speech to recognize).

Where the frame of an audio signal includes speech, a speech recognition engine is configured to recognize a word or phrase (a command) in the speech. As described above, each of the speech recognition engines—320A, B, C attempts to recognize speech in their respective audio signal, using the same limited vocabulary. To evaluate the recognition results from different microphones, the frames provided to the speech recognition engines are aligned in time, using, for example, a time stamp or sequence number for each flame. When a speech recognition engine detects a word in its frame, the speech recognition engine may also compute a confidence level indicating the probability that the speech recognition engine has correctly detected that word (i.e., the probability that a user actually spoke the word).

In the illustrated embodiment, a first speech recognition engine associated with microphone A processes its frames to identify the content of each frame. In the first two frames from microphone A, only non-speech is identified by the speech recognition engine and so no speech is recognized therein. Subsequently, in the third and fourth frames from microphone A, speech is detected. However, this speech does not correspond to any predefined commands. In one embodiment, the speech from the third and fourth frames may represent a trigger so that the speech recognition engine is to process words in the subsequent frames for the command.

In the fifth frame of the audio signal from microphone A, the speech recognition engine associated with microphone A detects speech input that matches a predefined word in the stored vocabulary. Thus, the fifth frame is identified as part of a group of frames that include a command that is to initiate (i.e., control) an operation or action, such as an operation that is to transmit a signal to a primary processor (e.g., the long phrase processor 220) to cause the primary processor to transition to an activated state. In this example, the speech recognition engine identifies the recognized word or words of the command with a relatively high confidence level of seventy-five percent. Additional commands are absent from the subsequent frames, as determined by the speech recognition engine associated with microphone A. The speech recognition engine may then provide data to decision logic 330 that identifies the detected word or phrase, and optionally the associated confidence level.

Similarly, a second speech recognition engine associated with microphone B decodes its sequence of frames to identify the content of each frame. The frames picked up by microphone B are identified by the second speech recognition engine as having the same content as the frames from microphone A. However, the second speech recognition engine recognizes the word in the fifth frame with a relatively mediocre confidence level of forty percent. This disparity between the two SR engines may be a result of the different acoustic planes on which their respective microphone A and microphone B pick up sound, and/or may be the result of microphone B being partially occluded. Like the first speech recognition engine, the second speech recognition engine may then provide its data to the decision logic (i.e., the identified words or phrases of the command and optionally the confidence level it has separately computed).

Like the first two speech recognition engines, a third speech recognition engine associated with microphone C processes its respective sequence of frames to identify the content of each frame. In this example, however, the third microphone C is occluded and therefore microphone C is unable to pick up speech that can be recognized. Thus, the frames of the audio signal from microphone C are identified as only non-speech. The third speech recognition engine may then provide an indication to decision logic 330 that no speech is detected in its frames. Alternatively, the third speech recognition engine may provide no data or a null value to indicate that only non-speech is identified in the frames from microphone C.

The decision logic 330 may use the data provided by the speech recognition engines to determine whether an operation or process should be initiated, such as causing a signal to be transmitted to a primary processor that is to activate the primary processor and/or cause the device to wake up or otherwise unlock. In one embodiment, the decision logic may evaluate the confidence levels received from the speech recognition engines by, for example, comparing the confidence levels to a predetermined threshold and if no confidence levels exceed the predetermined threshold then no operation is initiated. Conversely, if at least one confidence level satisfies the evaluation by the decision logic, then an operation corresponding to the detected command (associated with the sufficiently high confidence level) is initiated by the decision logic. For example, if the command is recognized in the fifth frames picked up by microphone A, the decision logic may evaluate the confidence level of seventy-five percent in that case and, if that confidence level is satisfactory, then the decision logic may cause a signal to be transmitted to the primary processor which causes activation of the primary processor.

In one embodiment, the decision logic 330 further selects a preferred microphone and causes that selection to be signaled or transmitted to the primary processor in combination with a signal to activate the primary processor (either as a separate signal or as the same signal). The decision logic may select the preferred microphone by evaluating the three confidence levels computed for the detected word or phrase; for example, the preferred microphone may be microphone A because its audio signal has the highest confidence level for the recognized word or phrase (command). The decision logic may cause a signal indicating the selection of microphone A to be signaled or transmitted to the primary processor so that the primary processor may immediately begin monitoring speech of the user for input using the preferred microphone, without having to process multiple audio signals and/or determine which microphone to use for speech input.

In the illustrated embodiment of FIG. 4, the command may be recognized from the content of a single frame (provided that the frame is defined to be long enough in time). However, a command may span several frames, and a speech recognition engine may be configured to identify a command across several frames. In one embodiment, the decision logic may evaluate the confidence levels from a group of multiple frames (in a single sequence or from a single microphone). The decision logic may require that the confidence level from each frame in the group (from a particular sequence) be satisfactory, in order to initiate an operation. In another embodiment, however, the satisfactory confidence levels may originate from frames of audio signals picked up by different microphones. For example, consider a command that spans two frames: the confidence level of the first frame from audio signal A may be satisfactory but the confidence level of the second frame from audio signal A is not, while the first frame from another audio signal B is unsatisfactory but the confidence level for the second frame from the audio signal B is satisfactory. The decision logic may in that case determine that the overall confidence level for that recognized command is satisfactory across two frames, despite the existence of some unsatisfactory frames. In such an embodiment, the decision logic may select as the preferred microphone the microphone that picked up the most recent frame having a satisfactory confidence level, in this example, audio signal (or microphone) B.

Figure 5:
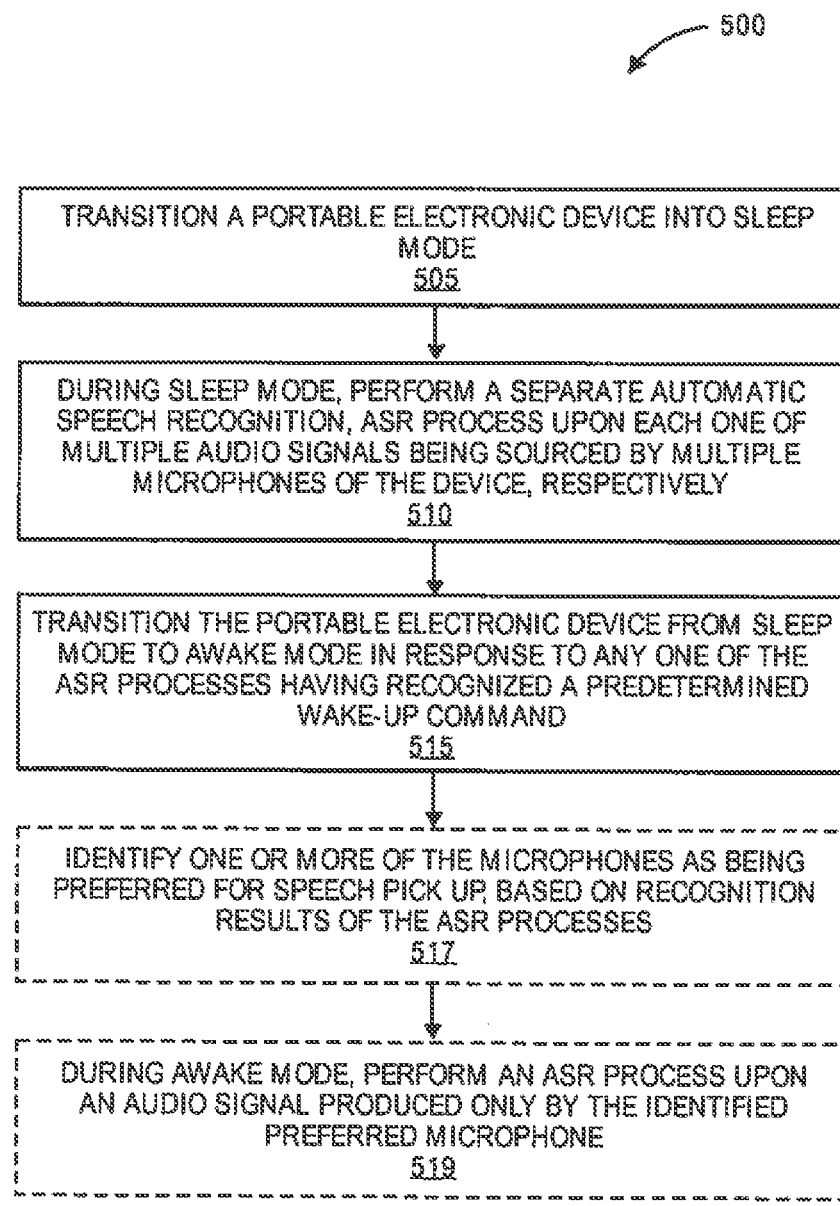
FIG. 5 is a flow diagram illustrating an embodiment of a method for transitioning a handheld portable electronic from sleep mode to awake mode device using parallel phrase recognition.

Now turning to FIG. 5, this flow diagram illustrates an embodiment of a method 500 for adjusting a power state of a handheld portable electronic device using parallel phrase recognition. This method 500 may be performed in the handheld portable electronic device 100 of FIG. 2. Beginning first with operation 505, a power state of the handheld portable electronic device performing the method 500 is reduced. The power state of the portable electronic device may be reduced in any well-known manner, such as by turning off a display of the device, reducing power to memory, and by deactivating a primary processor. Reducing the power state of the portable electronic device may be a result of placing the device in a "sleep" mode or similar power-saving mode. In one embodiment, separate circuitry, such as an auxiliary processor, remains activated while the primary processor is deactivated. Therefore, the portable electronic device may continue some simple and power-conservative operations even while the power state is reduced.

Because power-conservative circuitry of the portable electronic device remains activated even while the overall power state for the device is reduced, the portable electronic device remains configured to monitor speech of a user. Accordingly, the portable electronic device may continue to pick up speech input from the user even when the power state of the device is reduced. In operation 510, the audio signals from the microphones are processed in parallel by separate ASR engines that use a relatively small vocabulary (i.e., a stored list of recognizable words). Because the vocabulary is small—e.g., on the order often or fewer words, and no more than five words in a phrase—processing the audio signals in parallel is relatively computationally inexpensive and allows the portable electronic device to remain in the reduced power state. The portable electronic device may then detect a command spoken by the user while the power state of the device is reduced, in operation 510.

In the reduced power state, one or more of the microphones may be occluded, thereby preventing the occluded microphone from picking up speech input. This occlusion may be a common occurrence during the reduced power state—e.g., the user may have the placed the device in a pocket or on a surface while the device is not in use—or this occlusion may be perpetual—e.g., the user may prefer to maintain the device in a protective case that obstructs one of the microphones, or the microphone may be occluded due to damage. Consequently, the portable electronic device may be unable to determine which microphone will provide the most reliable audio signal. To address this issue, the portable electronic device may process the audio signals from all of the microphones in parallel, and therefore the command is very likely to be recognized.

Typically, when the portable electronic device detects the command in speech input from the user, either the user wishes to use the portable electronic device or another computationally expensive operation must occur. In either instance, the portable electronic device is unable to remain in the reduced power state. Thus at operation 515, the power state of the portable electronic device is increased in response to the detection of the command. With the power state increased, the portable electronic device may return to a fully operational mode in which the device is able to, for example, accept more complex user input (e.g., speech input that exceeds five words), perform additional computationally expensive operations (e.g., transmitting cellular data using a cellular transceiver), rendering graphical output on a display of the device, and the like. In one embodiment, operation 515 includes waking up the device and/or unlocking one or more components (e.g., a display and/or tactile input) of the device. Optionally, in operation 517, one or more of the microphones are identified as being preferred for speech pick up, based on recognition results of the ASR processes. Therefore, in operation 519, while the device 100 is in awake mode, an ASR process for recognizing the user's speech input (as commands) is performed only upon an audio signal produced only by the identified preferred microphone.

Figure 6:
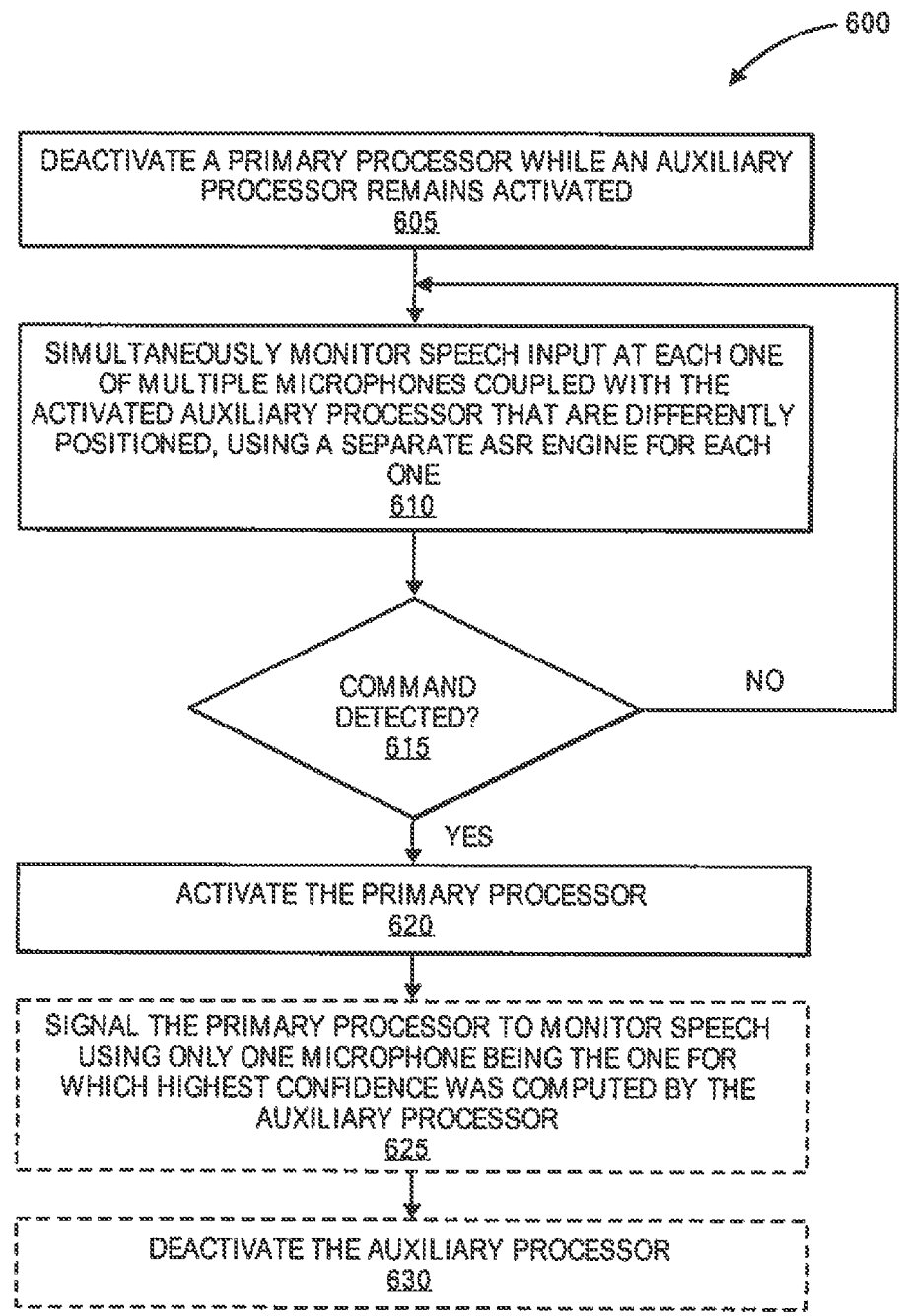
FIG. 6 is a flow diagram illustrating an embodiment of a method for activating a primary processor in a handheld portable electronic device using an auxiliary processor that processes multiple audio signals in parallel while the primary processor is deactivated.

With reference now to FIG. 6, this flow diagram illustrates an embodiment of a method 600 for activating a primary processor in a handheld portable electronic device using an auxiliary processor that processes multiple audio signals in parallel, while the primary processor is deactivated. This method 600 may be performed in the handheld portable electronic device 100 of FIG. 2. In one embodiment, the primary processor referenced in the method 600 corresponds to the long phrase recognition processor 220 while the auxiliary processor of the method 600 corresponds to the short phrase recognition processor 225 of FIG. 2. The method 600 begins at operation 605 where a primary processor of a handheld portable electronic device is deactivated while an auxiliary processor of the device remains activated. Generally, the auxiliary processor consumes less power than the primary processor and therefore the portable electronic device may enter a power-conservative mode (e.g., a "sleep" mode) while simultaneously continuing some operations, such as parallel phrase recognition using multiple microphones.

The auxiliary processor may remain activated while the primary processor is in the deactivated state in any suitable manner—e.g., the auxiliary processor may be perpetually activated, activated in response to the transition of the primary processor to the deactivated state, activated in response to user input (e.g., the device receives user input that causes the device to transition to a power-saving mode in which the primary processor is deactivated).

In the portable electronic device performing the method 600, the auxiliary processor is communicatively coupled with the microphones and is configured to receive the user's speech input that is picked up by the microphones. Thus, the speech input of the user is monitored by the activated auxiliary processor while the primary processor remains in the deactivated state, as shown at operation 610. The auxiliary processor may monitor the speech input of the user by speech recognition processing the audio signals from the microphones in parallel and using the same predetermined vocabulary of stored words that define a command in that they are associated with one or more operations that may be initiated by the auxiliary processor. As an advantage of the differently positioned microphones and the parallel audio signal processing, the auxiliary processor increases the probability that it will correctly detect a command in the speech input of a user. Accordingly, the user may not need to direct his or her speech to a particular microphone and/or clear the acoustic planes for each microphone (e.g., by removing any obstructions, such as a hand of the user or a surface).

At decision block 615, the auxiliary processor determines if a command is detected in the monitored speech input from the user. As described above, because the auxiliary processor provides the advantage of being communicatively coupled with multiple microphones whose audio signals are to be processed in parallel, the auxiliary processor may only need to detect the command in a single audio signal picked up by a single microphone (even though the auxiliary processor processes multiple audio signals from the microphones).

If the command is not detected at decision block 615 then the method 600 returns to operation 610, where the speech input of the user is continually monitored using the auxiliary processor while the primary processor remains deactivated. However, if the command is detected in the speech input of the user at decision block 615, then the method proceeds to operation 620.

At operation 620, the primary processor is activated in response to the detection of the command in the speech input of the user. In one embodiment, the auxiliary processor provides a signal to the primary processor that causes the primary processor to transition from the deactivated state to the activated state. With the primary processor activated, the portable electronic device may return to a fully operational mode in which the device is able to, for example, accept more complex user input, perform additional computationally expensive operations, and the like. In one embodiment, operation 620 includes waking up the device and/or unlocking one or more components (e.g., a display and/or tactile input) of the device.

In connection with the user's preference to activate the primary processor using speech input (rather than, for example, touch input), the portable electronic device may infer that the user desires to further interact with the portable electronic device using speech input. To facilitate the transition from processing speech input using the auxiliary processor to processing speech input using the primary processor, the auxiliary processor may transmit a signal to the primary processor that indicates which particular microphone (of the multiple microphones) is the preferred microphone to use for further speech input processing by the primary processor—this is optional operation 625. As explained above, in one embodiment, the microphone having the highest recognition confidence computed by the aux processor is signaled to be the single, preferred microphone. Thus, the primary processor may immediately begin monitoring speech of the user for input using the microphone indicated by the signal from the aux processor, without having to process multiple audio signals and/or determine which microphone to use for speech input.

In the optional operation 630, the auxiliary processor may be deactivated. The auxiliary processor may be deactivated in response to the activation of the primary processor, following the transmission of the activate signal to the primary processor at operation 620, or in another similar manner. The auxiliary processor may be deactivated because it is configured to perform relatively few and computationally inexpensive operations, such as activating the primary processor in response to speech input, and therefore the functions of the auxiliary processor in the context of speech input processing are obviated by the activation of the primary processor. Deactivating the auxiliary processor may conserve power and computational resources (e.g., storage and/or memory) of the portable electronic device performing the method 600.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A handheld portable electronic device comprising:
a plurality of microphones to pick up speech of a user, including a first microphone differently positioned than a second microphone;
a first processor communicatively coupled with the plurality of microphones and having an activated state and a deactivated state; and
a second processor communicatively coupled with the first processor and the plurality of microphones, the second processor configured to:
receive a plurality of audio signals from the plurality of microphones;
process each of the audio signals to recognize a command in any one of the audio signals; and
signal the first processor to transition from the deactivated state to the activated state in response to recognizing the command in one or more of the audio signals.

2. The handheld portable electronic device of claim 1, wherein a vocabulary of the second processor is limited to at most ten (10) words for a given language.

3. The handheld portable electronic device of claim 1, wherein the second processor is limited to recognize at most five (5) words.

4. The handheld portable electronic device of claim 1, wherein the plurality of microphones are no more than four and the first microphone located on a front face and in a top portion of an external housing of the handheld portable electronic device, the second microphone located in a bottom portion of the housing, and a third microphone located on a rear face and in a top portion of the housing.

5. The handheld portable electronic device of claim 1, wherein the second processor identifies a preferred microphone to the first processor as being the one whose respective audio signal has a highest confidence level for the recognized command, as computed by the second processor.

6. The handheld portable electronic device of claim 1, wherein the second processor is to signal a wake up event for waking up the handheld portable electronic device from a sleep mode, in response to recognizing the command.

7. The handheld portable electronic device of claim 6, wherein the second processor is to unlock a tactile input interface of the handheld portable electronic device, in response to recognizing the command.

8. A method in a handheld portable electronic device, comprising:
   activating an auxiliary processor;
   deactivating a primary processor;
   monitoring, using the activated auxiliary processor and while the primary processor remains deactivated, speech of a user through a plurality of microphones that are differently positioned from one another in the handheld portable electronic device, wherein the activated auxiliary processor performs automatic speech recognition (ASR) upon each signal from the plurality of microphones;
   detecting a command from the ASR that is performed upon the signal from a first microphone of the plurality of microphones; and
   activating the primary processor in response to the detecting of the command by the activated auxiliary processor.

9. The method of claim 8, further comprising:
   transitioning the portable electronic device from sleep mode to wake mode when the primary processor is activated; and then
   performing ASR by the activated primary processor.

10. The method of claim 9, wherein the monitoring of the user's speech comprises computing a respective speech recognition confidence level for each of the plurality of microphones; and wherein activating the primary processor is in response to evaluating the confidence levels.

11. The method of claim 10, wherein a respective plurality of confidence levels are computed for a respective plurality of frames of audio from each of the microphones, and further wherein activating the primary processor is in response to a first confidence level not exceeding a predetermined threshold while a second confidence level exceeds the predetermined threshold for two corresponding frames of different audio signals.

12. The method of claim 8, further comprising:
   selecting, by the activated auxiliary processor, just one of the plurality of microphones as a preferred one to use for picking up speech
   wherein the primary processor once activated uses only an audio signal from the preferred one of the plurality of microphones, while performing automatic speech recognition.

13. The method of claim 8, wherein the activating of the auxiliary processor is performed in response to the deactivating of the primary processor.

14. The method of claim 8, further comprising:
   deactivating the auxiliary processor in response to the activating of the primary processor.

15. A method in a handheld portable electronic device, comprising:
   transitioning the handheld portable electronic device into sleep mode;
   while in the sleep mode, detecting a command spoken by a user of the handheld portable electronic device using one or more of a plurality of microphones within the handheld portable electronic device based on having performed automatic speech recognition (ASR) upon each signal from the plurality of microphones; and
   transitioning the handheld portable electronic device from the sleep mode to awake mode in response to the detecting of the command.

16. The method of claim 15, further comprising:
   computing a respective speech recognition confidence level for each of the plurality of microphones; and wherein detecting the command is in response to one of the computed confidence levels exceeding a predetermined threshold.

17. The method of claim 16, further comprising:
   selecting the microphone associated with a greatest confidence level.

18. The method of claim 17, further comprising detecting speech input from the user using the selected microphone and not others of the plurality of microphones.

* * * * *